United States Patent [19]
Mickelson et al.

[11] Patent Number: 5,153,910
[45] Date of Patent: Oct. 6, 1992

[54] PROTECTED TELEPHONE NETWORK INTERFACE DEVICE

[75] Inventors: N. Peter Mickelson, Gorham; John J. Napiorkowski, Cape Elizabeth, both of Me.; Kelley L. Chico, Uniontown, Pa.

[73] Assignee: GTE Products Corporation, Stamford, Conn.

[21] Appl. No.: 523,457

[22] Filed: May 15, 1990

[51] Int. Cl.$^5$ .............................................. H04M 9/00
[52] U.S. Cl. ..................... 379/399; 379/412; 379/442
[58] Field of Search .............. 379/399, 412, 442, 327, 379/429

[56] References Cited

U.S. PATENT DOCUMENTS

| | | | |
|---|---|---|---|
| 4,613,732 | 9/1986 | Cwirzen et al. | 379/412 |
| 4,749,359 | 6/1988 | White | 379/399 X |
| 4,853,960 | 8/1989 | Smith | 379/399 X |
| 4,860,350 | 8/1989 | Smith | 379/399 X |
| 4,910,770 | 3/1990 | Collins et al. | 379/412 X |
| 4,932,051 | 6/1990 | Karan et al. | 379/399 |
| 4,945,559 | 7/1990 | Collins et al. | 379/442 X |
| 4,949,376 | 8/1990 | Nieves et al. | 379/399 |
| 4,979,209 | 12/1990 | Collins et al. | 379/399 |

OTHER PUBLICATIONS

CP-762 Network interface device, J103, 1985.
Keptel's SNI-5000, Oct./85.

Primary Examiner—James L. Dwyer
Assistant Examiner—M. Sheheta
Attorney, Agent, or Firm—James Theodosopoulos

[57] ABSTRACT

A telephone network interface device comprises a base structure, a protector assembly disposed within the base structure and a cover on the base structure. The device also includes a telephone jack and terminals to which a telephone subscriber's wiring can be connected. The combination of the base structure, cover, telephone jack and terminals comprise a stand-alone unit which can be mounted in a variety of enclosures when installed at a telephone subscriber's premises.

2 Claims, 5 Drawing Sheets

PROTECTED TELEPHONE NETWORK INTERFACE DEVICE

This invention concerns telephone network interface devices. Such devices are shown in the following U.S. Pat. Nos.: 4,488,008; 4,560,839; 4,588,238; 4,624,514; 4,647,725; 4,723,919; 4,741,032; 4,742,541; 4,749,359; 4,800,588. Such devices provide demarcation between the telephone company lines and the telephone subscriber's wiring. Such devices are generally compartmentalized so that the subscriber does not have access to the telephone company's portion of the device. The subscriber has access to a jack, typically an RJ-11C jack, and to terminals to which the subscriber's wiring can be connected.

Generally, the surge protectors in telephone network interface devices, which are located in the telephone company's portion of the device, are somewhat remote from the jack or are in a separate housing. An exception is module 91, shown in FIG. 8 of U.S. Pat. Nos. 4,742,541, which contains protector means 120 and jack (aperture) 127. However, this invention provides advantages over the module shown in said patent.

SUMMARY OF THE INVENTION

This invention provides a network interface device in which a jack, a protector and subscriber terminals are contained within a single stand-alone unit which can be mounted in a variety of enclosures when installed at a subscriber's premises. The unit could be used singly for a subscriber having an incoming telephone line. Or in the case of subscriber premises having two, six, ten or more incoming lines, the units could be arranged in a side by side relationship, the elongated dimensions of the units being parallel to each other, in a single enclosure. Such an enclosure is shown in FIG. 2 of U.S. Pat. Nos. 4,749,359. An advantage of the instant invention is that the space required in such multiple telephone line enclosures can be about halved because the protector and jack are in the same unit. Consider a typical twenty-five line enclosure. The enclosure is a rectangular box. The twenty-five housings containing the twenty-five jacks would be in a column on, say, the right hand side of the box. The twenty-five housings containing the twenty-five protectors would be in a column on the left hand side of the box, each protector housing in alignment with a jack housing. When protector-jack units as per this invention are used in an enclosure of such a size, the number of incoming telephone lines can be about doubled, because the twenty-five protector housings in the left hand column are no longer needed and could be replaced by twenty-five protector-jack units.

In one embodiment, the protector-jack unit of this invention contains cover which, when raised, disconnects the subscriber terminals for safety purposes.

In another embodiment, the subscriber terminals are mounted on a detachable terminal strip for replacement purposes.

In another embodiment, electrical connection to the subscriber terminals is made my means of a plug inserted into the jack. The plug is arranged to automatically be removed from the jack when the cover is raised in order to electrically disconnect the subscriber terminals.

DESCRIPTION OF THE PREFERRED EMBODIMENT

Figure 1:
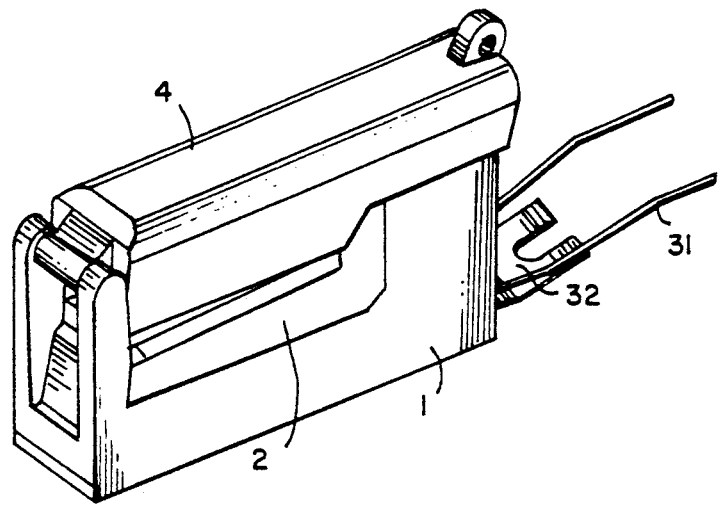
FIG. 1 is a perspective view of one embodiment of an interface device of the present invention with the cover closed.

As shown in FIG. 1 a network interface device in accordance with this invention comprises a base structure 1, a cover 4 and a terminal strip 2. Lead-in wires 31 serve to connect the device to the telephone company lines. Mounting means 32, which is also a grounding bracket, serves as a means for mounting the device in a suitable enclosure.

Figure 2:
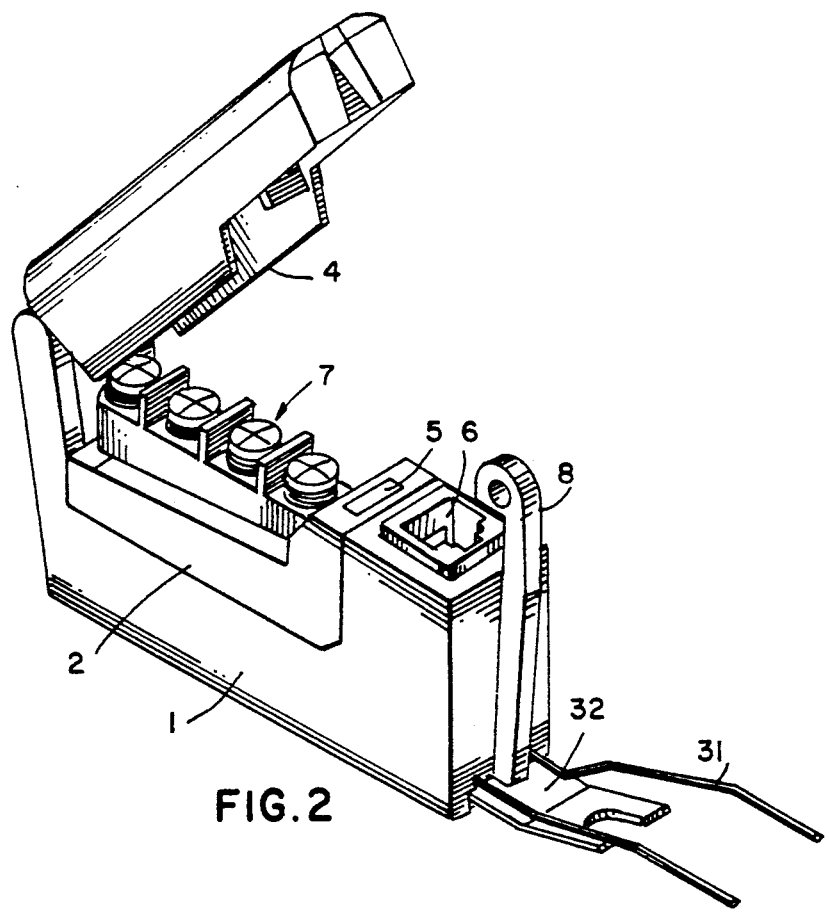
FIG. 2 is a perspective view with the cover open.

FIG. 2 shows the device with cover 4 open. Terminal screws 7 are components of terminal strip 2 and serve as the terminals to which a subscriber's wiring is connected. Terminal screws 7 are equipped with washers 71, shown more clearly in FIG. 4, for separating individual wires which may be connected to any one screw 7. Mounted on base structure 1 is a jack 6 which, in this embodiment, is a receptacle for FCC standardized plug RJ-11C. A subscriber can use jack 6 to test the integrity of the telephone network.

Also shown in FIG. 2 is a latch 8 which can be used to secure cover 4 in its closed position. Latch 8 is provided with a hole 81 through which a subscriber may fasten a padlock. Disposed in terminal strip 2 is a movable contact activator 5 the purpose of which is to make electrical connection between lead-in wires 31 and terminal screws 7 when cover 4 is closed and to break the electrical connection when cover 4 is open.

Figure 3:
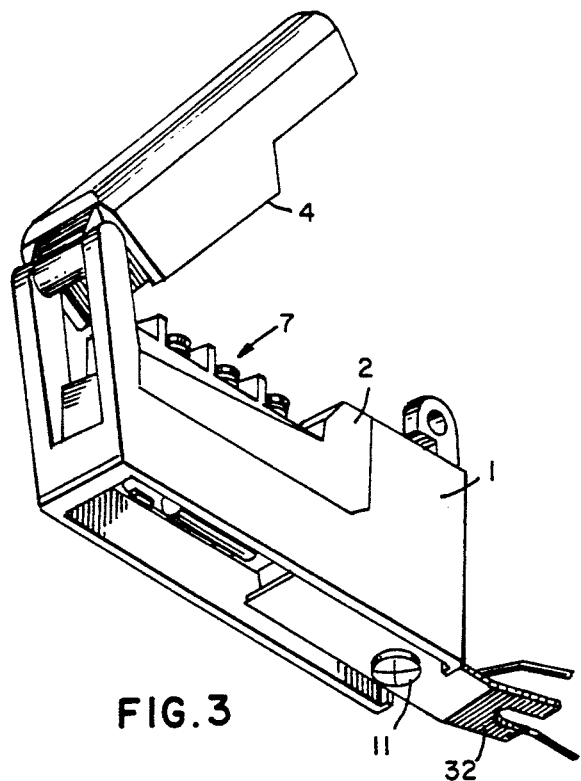
FIG. 3 is a perspective view with the cover open viewed from below.

FIG. 3 shows mounting means 32 secured to base structure 1 by means of screw 11.

Figure 4:
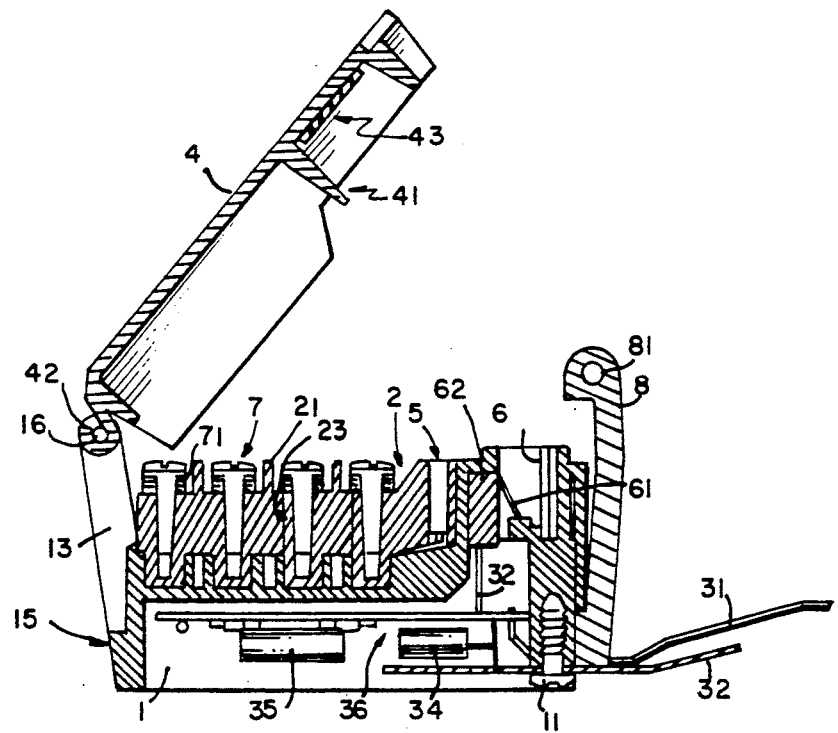
FIG. 4 is a cross-section along the longitudinal centerline.
Figure 8:
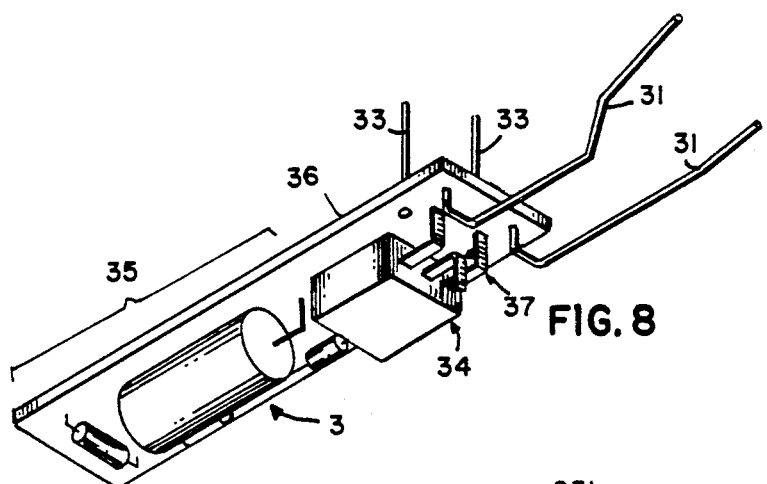
FIG. 8 is a perspective view of the protector assembly.

FIG. 4 shows protector assembly 3 which, in this embodiment, consists of circuit card 36 on which are mounted a test circuit 35 and a protective element 34; this is shown in more detail in FIG. 8. FIG. 4 also shows mounting means 32 secured to base structure 1 by means of screw 11. There is a step 15 in base structure 1 which can be used, along with mounting means 32, to securely mount the device in a suitable enclosure.

Also shown in FIG. 4 are spring contact wires 61 which are a standard part of an RJ-11C receptacle. Contact wires 33 are part of teh electrical path between lead-in wires 31 and spring contact wires 61. The electrical path is shown in more detail in FIGS. 8, 9 and 10.

On cover 4 is an actuating tab 41 which serves to depress contact actuator 5 when cover 4 is closed, thereby passing horizontal arms 23a of contact members 23 into electrical contact with contact extensions 63 which are electrically connected to contact wires 33. Thus the electrical path from lead-in wires 31 to terminal screws 7 is via electrical strips 9, contact wires 33, contact extensions 63, horizontal arms 23a of contact members 23 to upper arms 23b thereof which are in contact with terminal screws 7. An insert 62 serves to form one wall of jack 6 and to hold in proper orientation spring contact wires 61 and contact wires 33.

Hinge structure 13 serves to hold cover 4 in place through the action of pin 16 and hinge 42. Gasket 43 on cover 4 closes over, and seals, jack 6 when cover 4 is closed.

Figure 5:
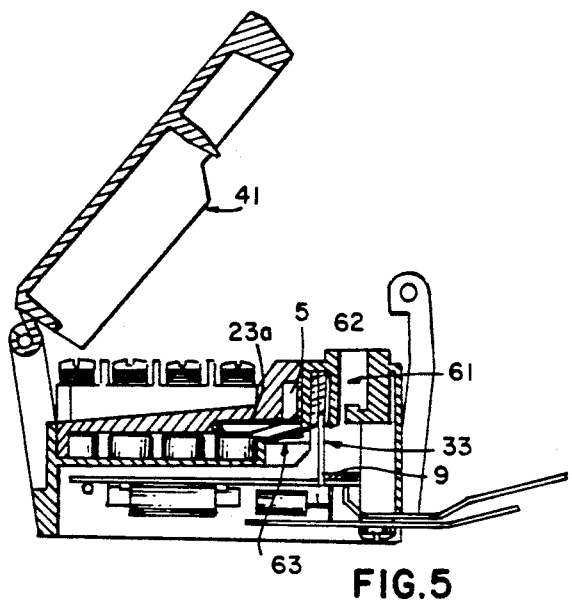
FIG. 5 is a longitudinal cross-section offset from the centerline.

FIG. 5 is a cross sectional view taken parallel to the plane in FIG. 4 but offset to show a little more clearly that contact actuator 5, when depressed by tab 41, presses horizontal arms 23a into contact with contact extensions 63.

Figure 6:
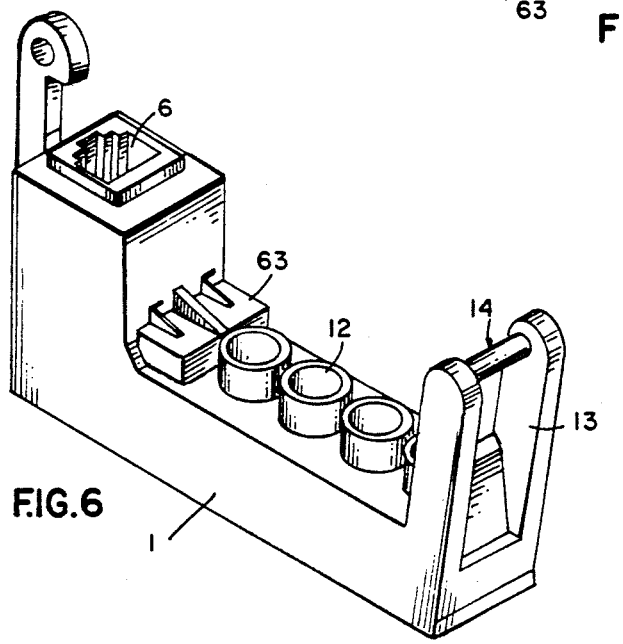
FIG. 6 is a perspective view of the base structure.

FIG. 6 shows base structure 1 with terminal strip 2 removed. Higne structure 13 and pin 14 are more clearly shown, as well as contact extensions 63. There are wells 12 on an upper surface of base structure 1. Terminal strip 2 is mounted on base structure 1 by means of protrusions 22 (FIG. 7) fitting into wells 12.

Figure 7:
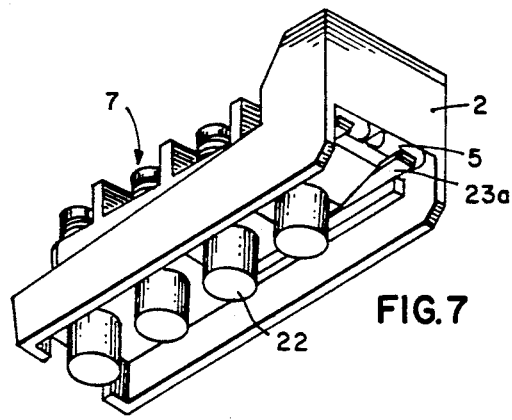
FIG. 7 is a perspective view of the terminal strip.

FIG. 7 shows terminal strip 2 removed from base structure 1. Horizontal arms 23a are shown which are depressed by contact actuator 5 as described above.

FIG. 8 shows protector assembly 3 comprising protective element 3 and test circuit 35 mounted on circuit card 36. In this embodiment protective element 34 is a bidirectional voltage sensitive switch having two line pins 38 and a ground pin 37. Line pins 38 extend through circuit card 36 and are in electrical contact with electrical strips 9 (see FIG. 9) on the upper surface of circuit card 36. Ground pin 37 is in electrical contact with grounding bracket 32. Protector assembly 3 is detachable for field replacement purposes.

Figure 9:
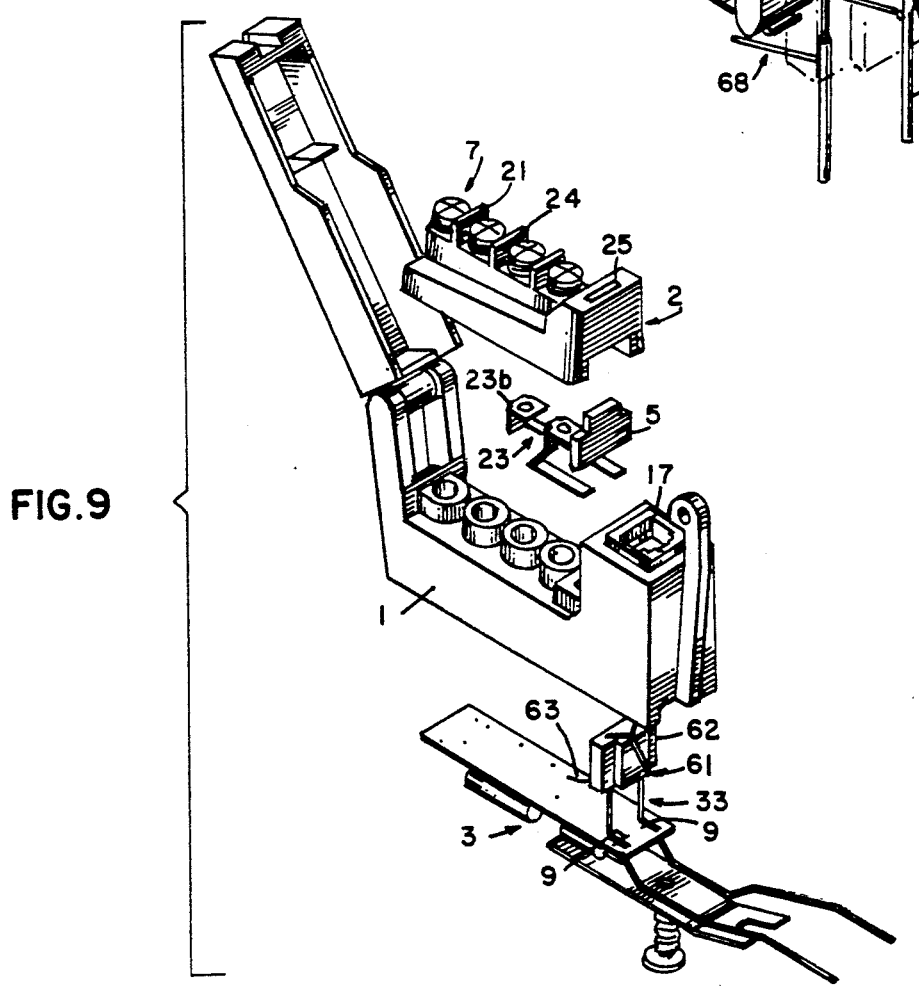
FIG. 9 is an exploded perspective view of the interface device.

FIG. 9 is an exploded view showing details of contact members 23. Contact members 23 extend through slots 24 in terminal strip 2 with upper arms 23b being retained under terminal screws 7. Contact actuator 5 is shown removed from its aperture 25 in which it is normally retained. Also shown are contact wires 33 extending into insert 62 where they connect with spring contact wires 61 and with contact extensions 63. Insert 62 normally resides within recess 17 within base structure 1. Barriers 21 on terminal strip 2 separate terminal screws 2 from each other.

Figure 10:
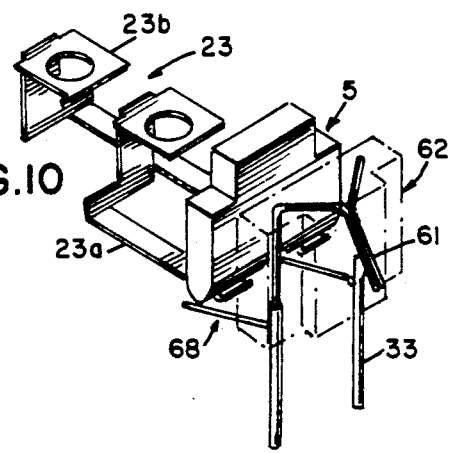
FIG. 10 is an exploded perspective view of contacts as shown in FIG. 9.

FIG. 10 shows exploded details of contact members 23, contact actuator 5, contact extensions 63, spring contact wires 61 and contact wires 33. Insert 62 is shown in ghost image to show more clearly how the contact components are aligned. In one embodiment contact extensions 63 consist of the same wire as spring contact wires 61, with contact wires 33 welded to them inside insert 62.

Figure 11:
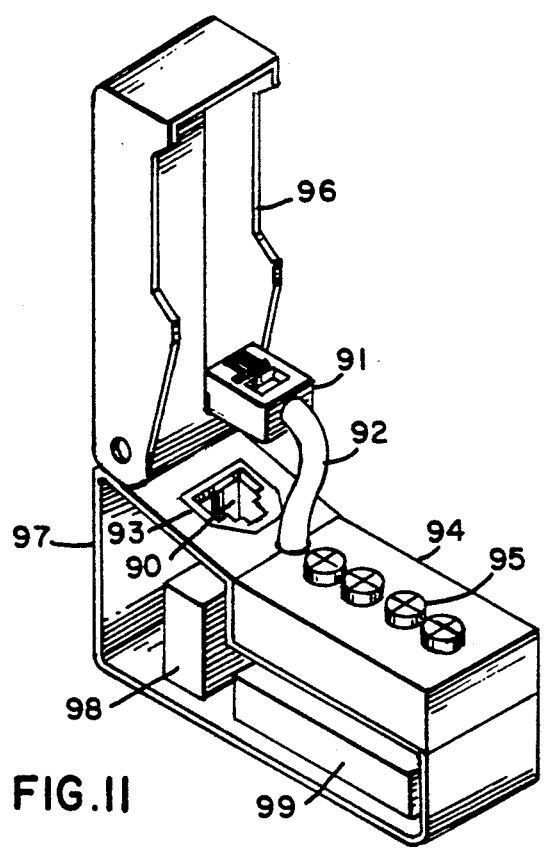
FIG. 11 is a cross-sectioned perspective view of another embodiment of an interface device in accordance with this invention.

FIG. 11 shows another embodiment of the invention comprising base structure 97, cover 96, terminal strip 94, protector assembly 98, test circuit 99 and jack 90. Electrical connection from the telephone company lines to terminal screws 95 occurs only when plug 91 is plugged into jack 90. Plug 91 is connected to terminal strip 94 by a flexible cable 92. Plug 91 may be secured to cover 96 so that raising cover 96 will unplug plug 91. Gasket 93 encircles jack 90 for sealing purposes when cover 96 is closed.

Figure 12:
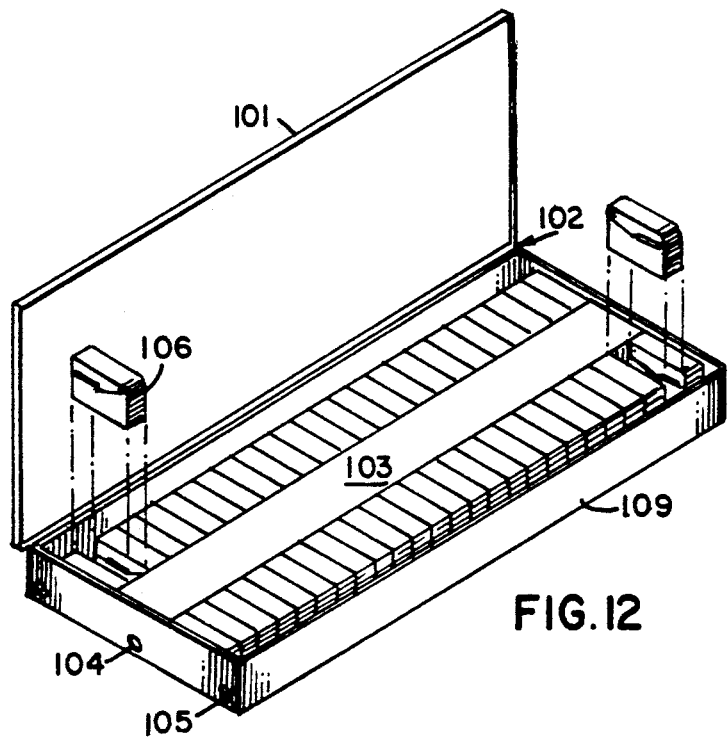
FIG. 12 is a perspective view of an interface device of the present invention shown in an intended application.

FIG. 12 shows one example of an enclosure in which network interface devices in accordance with this invention could be used. This example shows an enclosure 109 serving fifty subscriber lines. Enclosure 109 has a cover 101 to exclude weather and unwanted access.

A central cover 103 encloses a cable splicing chamber in which connections are made between a network cable entering hole 104 and each subscriber network interface device 106. Subscriber wiring exits the housing via holes 105. A hinge 102 serves to conveniently attach the cover to the housing.

In operation, a surge voltage above a predetermined amount occurring on either lead-in wire 31 would appear at protective element 34, thereby conducting the surge through ground pin 37 to grounding bracket 32 which would be grounded to earth ground.

We claim:
1. A telephone network interface device comprising:
   a base structure containing mounting means for mounting the network interface device, the mounting means also being a grounding bracket;
   a protector assembly disposed within the base structure;
   an openable cover on the base structure;
   a telephone jack in the base structure;
   a terminal strip on the structure, the terminal strip containing terminals to which a telephone subscribers' wiring can be connected;
   the telephone jack and the terminal being exposed when the cover is open;
   the combination of the base structure, cover, telephone jack and terminal strip comprising a stand-alone unit which can be mounted in a variety of enclosures when installed at a telephone subscriber's premises.

2. The device of claim 1 wherein the protector assembly includes a bidirectional voltage sensitive switch containing two line pins and a grounding pin, the grounding pin being in electrical contact with the mounting means.

* * * * *